United States Patent [19]

Kurakake

[11] Patent Number: 4,575,667
[45] Date of Patent: Mar. 11, 1986

[54] AC MOTOR SPEED CONTROL APPARATUS
[75] Inventor: Mitsuo Kurakake, Hino, Japan
[73] Assignee: Fanuc Ltd, Minamitsuru, Japan
[21] Appl. No.: 386,130
[22] Filed: Jun. 7, 1982
[51] Int. Cl.$^4$ ............................................. H02P 5/40
[52] U.S. Cl. ................................. 318/803; 318/811; 318/721
[58] Field of Search ................ 318/341, 830, 807–811, 318/799–801, 803, 220–223

[56] References Cited

U.S. PATENT DOCUMENTS 4,153,863  5/1979  Schachte ............................. 318/341
4,201,936  5/1980  Roumanis ........................... 318/341

Primary Examiner—David Smith, Jr.
Attorney, Agent, or Firm—Staas & Halsey

[57] ABSTRACT

An apparatus for detecting the speed of an AC motor such a synchronous motor or induction motor of the type in which a pulse generator is connected to the shaft of the motor for producing pulses indicative of the motor speed. The motor speed is detected by counting clock pulses whenever the pulses are generated by the pulse generator. Provided are speed computing means responsive to an interrupt pulse of a constant period for estimating the present actual speed of the motor, at times between pulses from the pulse generator, on the basis of the magnitude of a previously commanded armature voltage, magnitude of past and present armature current and a past detected speed, in accordance with the characteristics of the motor. The estimated speed is taken as the detected speed to enable the speed of the motor to be detected with improved accuracy.

3 Claims, 22 Drawing Figures

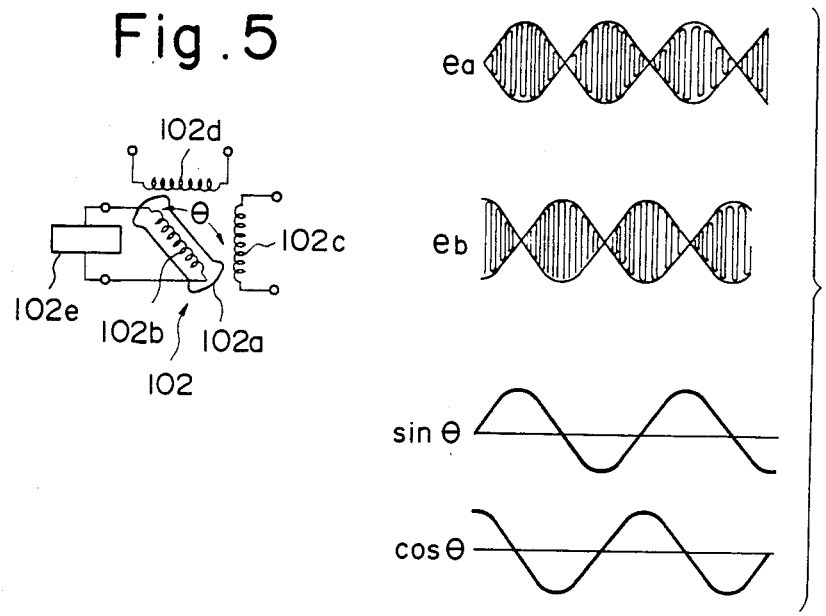
Fig. 5
Fig. 6
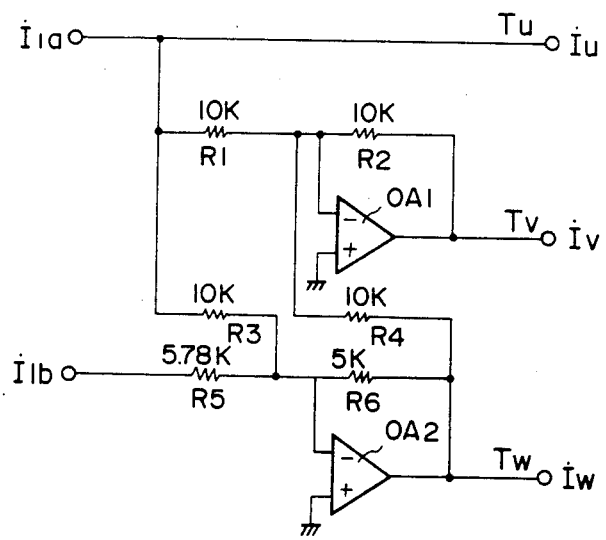
Fig. 7

AC MOTOR SPEED CONTROL APPARATUS

BACKGROUND OF THE INVENTION

This invention relates to an apparatus for detecting the speed of an AC motor such as a synchronous motor or induction motor and, more particularly, to an apparatus which is well-suited for use in detecting the speed of an AC motor when the motor is rotating at a low speed.

A rotating field-type synchronous motor, in which the stator is the armature and the rotor the field pole, operates in such a manner that passing a three-phase alternating current into the stator windings (armature windings) gives rise to a rotating field that "pulls" the field pole into synchronism so that the field pole rotates at the same speed as the magnetic field. One method of controlling such a synchronous motor is to regulate the instantaneous value of the stator (armature) current, whereby a torque can be generated in a manner equivalent to that of a DC motor. A synchronous motor control system of this type will now be described in further detail with reference to FIGS. 1 through 4.

As shown in (a) and (b) of FIG. 1, which illustrates the torque generation mechanism of a shunt DC machine, current is switched by means of a commutator in such a manner that armature current $I_a$ is perpendicular to the principal flux $\phi$ at all times. The torque produced in such case is given by the following formula:

$$T = k\phi I_a \quad (1)$$

(where k is a constant), from which it will be seen that the torque T is proportional to the armature current $I_a$ when the principal flux $\phi$ is constant. In FIG. 1, FM represents the field pole, AM the armature, and AW the armature winding. If the foregoing relation is applied to a rotating field-type synchronous motor as shown in FIG. 2, then correspondence can be established between the flux $\phi$ and the principal flux vector $\phi_s$ of a field pole PM, and between the armature current $I_a$ and the current vector $I_s$ of an armature winding SW. Thus the torque T generated by the synchronous motor will be:

$$T = k'\phi_s I_s \cos \gamma \quad (2)$$

(where k' is a constant). Note that $\gamma$ is the phase difference between armature current $I_s$ and induced voltage $E_o$, with reference being had to FIG. 3 showing the equivalent circuit of the synchronous motor. In FIG. 3, $r_a$ denotes the resistance of the armature winding SW, and $X_s$ the synchronous reactance which takes into account the armature reaction as well as the armature leakage flux.

If control is so effected that the induced voltage $E_o$ and armature current $I_s$ are made equal in phase, in other words, in such a manner that the principal flux $\phi_s$ and armature current $I_s$ are rendered perpendicular, then the torque T given in Eq. (2) will be expressed by:

$$T = k'\phi_s I_s \quad (3)$$

(where $K_T$ is a conversion constant). Thus the synchronous motor can be driven in a manner equivalent to the generation of torque in a DC motor.

Accordingly, the proposed method of synchronous motor control mentioned above senses the phase of the induced electromotive voltage, generates a current having said phase, and applies the current command to the armature winding of the synchronous motor, thereby driving and controlling the synchronous motor in a manner equivalent to a DC motor. Since the induced voltage $E_o$ and principal flux are displaced in phase by 90°, the phase of the induced electromotive voltage can be detected from the principal flux, that is, from the position of the field pole. The proposed system for controlling a synchronous motor is illustrated in the block diagram of FIG. 4.

In FIG. 4, the rotating field-type synchronous motor 101 is indicated at 101. Connected to the shaft of the motor 101 is a pulse generator such as resolver 102 for sensing the position of the field pole. As shown in FIG. 5, the resolver 102 includes a rotor 102a, a rotor winding 102b, two stator windings 102c, 102d displaced in phase from each other by 90°, and a carrier wave generating circuit 102e for generating a carrier wave sin wt. If we assume that the rotor 102a occupies a position corresponding to the angle $\theta$, then the stator windings 102c, 102d will produce voltages given by the following:

$$e_a = \sin \theta \cdot \sin wt \quad (4)$$

$$e_b = \cos \theta \cdot \sin wt \quad (5)$$

Thus the resolver 102 produces a sine wave voltage $e_a$ and a cosine wave voltage $e_b$, as shown in FIG. 6, both of which conform to the position $\theta$ of the field pole of synchronous motor 101.

Returning to FIG. 4, the output sine wave and cosine wave voltages $e_a$, $e_b$ of resolver 102 are applied to a synchronous rectifying circuit 103 which synchronously rectifies these into sine and cosine signals $\sin \theta$, $\cos \theta$, as shown in FIG. 6. A quadrupling circuit 104a also receives the sine and cosine wave voltages $e_a$, $e_b$ and is adapted to convert them into pulse trains having four times the frequency of the input sine and cosine signals. The qaudrupling circuit 104a, which functions to monitor the phases of the sine and cosine voltage signals $e_a$, $e_b$, delivers a forward pulse train $P_n$ of the quadrupled frequency on line $l_1$ when the motor is rotating in the forward direction, and a reverse pulse train $P_r$ of the quadrupled frequency on line $l_2$ when the motor is rotating in the reverse direction. The forward and reverse pulse trains $P_n$, $P_r$ are applied to a frequency-voltage converter (hereafter referred to as an F/V converter) 104b adapted to convert the pulse frequency into a voltage signal TSA, which represents the actual speed of the synchronous motor 101. An arithmetic circuit 105 receives the actual speed voltage signal TSA as well as a speed command voltage VCMD which enters from a speed command circuit, not shown, and is adapted to compute the difference (known as the speed error) ER between TSA and VCMD. The output ER of the arithmetic circuit 105 is applied to an error amplifier 106 for amplifying the speed error ER to produce the amplitude $I_s$ for an armature current. The output $I_s$ of the amplifier 106 is applied to multiplier circuits 107, 108, which receive also the outputs $\cos \theta$, $\sin \theta$, respectively, from the synchronous rectifying circuit 103. Multiplying circuit 107 therefore produces a current command $I_1 a$ ($= I_s \cdot \cos \theta$), and multiplying circuit 108 a current command $I_1 \cdot b$ ($= I_s \cdot \sin \theta$). Accordingly, the current commands are of two different phases. The two-phase signals are converted into three-phase signals by a two phase/three phase converting circuit 109 having the construction shown in FIG. 7.

Referring to FIG. 7, the converting circuit 109 includes two operational amplifiers OA$_1$, OA$_2$, four 10 Kohm resistors R$_1$ through R$_4$, a 5.78 Kohm resistor R$_5$, and a 5 Kohm resistor R$_6$. With these values for the resistors R$_1$ through R$_6$, and with the circuit arrangement shown in FIG. 7, the converting circuit 109 will produce the following outputs at its terminals T$_u$, T$_v$, T$_w$:

$$\left.\begin{array}{l} i_u = i_{1a} \\ i_v = \frac{-1}{2} i_{1a} + \frac{3}{2} i_{1b} \\ i_w = \frac{-1}{2} i_{1a} - \frac{3}{2} i_{1b} \end{array}\right\} \quad (6)$$

These three signals are three-phase current commands displaced in phase from one another by $2\pi/3$ and of the same phase as the three phases of the induced voltage E$_o$.

Returning to FIG. 4, arithmetic circuits 110U, 110V, 110W are provided for each of the above phases and serve to compute the different between the commanded currents $\dot{I}_u$, $\dot{I}_v$, $\dot{I}_w$ and actual phase currents $\dot{I}_{au}$, $\dot{I}_{av}$, $\dot{I}_{aw}$, respectively. Numeral 111 denotes an arithmetic circuit for adding $\dot{I}_{av}$ and $\dot{I}_{aw}$ to produce the phase current $\dot{I}_{au}$ of the U-phase. Converters 112V, 112W are provided for sensing the phase currents $\dot{I}_{av}$, $\dot{I}_{aw}$ of the V- and W-phase. Current amplifiers 113U, 113V, 113W are provided for each of the three phases and function to amplify the current differentials of the respective phases and to generate three phase armature voltage $\dot{U}_u$, $\dot{U}_v$, $\dot{U}_w$. The outputs i$_u$, i$_v$, i$_w$ of the current amplifiers are applied to a pulse width modulating circuit 14, whose output side is connected to an inverter 115 to control the same. Designated 116 is a three-phase AC power supply whose three-phase AC output is rectified into direct current by a well-known rectifying circuit 117 having a group of diodes 117a and a capacitor 117b.

To achieve accurate control of a synchronous motor with the foregoing arrangement, it is essential that the rotational speed of the motor be sensed with great accuracy when the motor is rotating at both high and low speeds. Accordingly, in a prior-art speed sensing system, a pulse generator 102 is employed to generate the two-phase signals e$_a$, e$_b$, which are displaced in phase by $\pi/2$ and have a frequency f which is proportional to the rotational speed of the motor, as shown in FIG. 4. Then the two-phase signals are applied to the quadrupling circuit 104a to convert them into signals having a frequency of 4.f. Finally, the F/V converter 104b produces a voltage proportional to the frequency 4.f, namely a voltage (the voltage TSA indicative of actual motor speed) proportional to the motor speed. According to this method, however, the magnitude of the output voltage of the F/V converter drops sharply and is no longer proportional to the motor speed when said speed reaches a low level. Furthermore, rather than subjecting the frequency of the pulses from pulse generator 102 to a frequency-to-voltage conversion, it is better, as far as LSI techniques are concerned, to have a microcomputer read the pulses directly as a digital quantity. Various methods of reading speed is digital fashion have been proposed, one of example of which will be described with reference to FIG. 8.

FIG. 8 illustrates a conventional method in which the pulses from a pulse generator 211 are counted for a predetermined period of time and delivered to a microcomputer 214. The pulse generator 211 generates a pulse PC each time the motor to which it is connected rotates by a predetermined amount. The pulses are counted by a counter 212 whose content is transferred to a register 213 at predetermined intervals, whereupon the counter is reset. The content of the register is then read as the actual motor speed by the microcomputer 214. Thus, by repeating the foregoing operation, actual speed can be extracted in digital fashion. While this method enables speed to be sensed with good accuracy when the motor is rotating at high speed, this is not the case at low motor speeds because the pulses generated by the pulse generator 211 at such time are spaced far apart. In other words, accuracy declines because the pulse period lengthens excessively in the lowspeed region. To improve accuracy, that is, to improve resolution when the motor rotates at a low speed, the number of pulses generated by the pulse generator 211 per revolution must be increased, or the reading cycle must be lengthened. However, since the number of pulses which can be produced by the pulse generator 211 is limited to 10,000 per revolution, a significant increase in resolution cannot be obtained. The alternative approach, namely that of lengthening the reading cycle, only succeeds in degrading control response. To be more specific, the reading cycle (sampling period) for the data in register 213 as read by the microcomputer must be on the order of 1 msec in view of the response of the speed control system. Lengthening the reading cycle would therefore worsen the response. In this connection, let us examine a case where the data in register 213 is sampled at a period of 1 msec, pulse generator 211 produces a pulse train P$_c$ at a rate of 10,000 pulses per revolution, and the motor rotates at a very low speed of 1 rpm. Refer to FIG. 9, in which SP$_i$ denotes the sampling pulses, P$_c$ the pulses produced by the pulse generator 211, and CN the value of the count in counter 212. As described above, the pulses P$_c$ from the pulse generator 211 are counted by counter 212, the data in counter 212 is set in register 213, and the counter is reset, in sync with the sampling pulses SP$_i$, and the data stored in the register is subsequently read by the microcomputer 214. Since the sampling period is 1 msec and the period of the pulses P$_c$ is 6 msec., the value of the count CN in counter 212 is one when the initial sampling pulse SP$_1$ is generated, but is zero for the sampling pulses SP$_2$ through SP$_6$. In other words, the speed data input to the microcomputer is the intermittent data 1,0,0,0,0. This makes it impossible to achieve accurate control of speed with a quick response. The inventors have therefore proposed (Japnese Patent Application No. 56-74677) a speed detection system which does not rely upon intermittent speed data, thereby enabling speed detection with great accuracy. This previously proposed system will now be described.

In the proposed system, the period T of pulses P$_c$ generated by a pulse generator when a motor is running at low speed is found by counting the pulses, and the motor speed is sensed on the basis of the period T. If we assume that N-number of clock pulses CP are generated in the period of the pulses P$_c$ and that the period of the clock pulses is T (=0.125 $\mu$s), then the frequency f of the pulses $P_c$ from the pulse generator may be expressed:

$$f = 1/T$$
$$= 1/N \cdot \Delta T \text{ (Hz/}\mu\text{sec)}$$
$$= 10^6/N \cdot \Delta T \text{ (Hz/sec)}$$
$$= 60 \times 10^6/N \cdot \Delta T \text{ (Hz/min)}$$

Substituting 0.125 for T, we have:

$$f = 480 \times 10^6/N \text{ (Hz/min)} \qquad (7)$$

If the pulse generator produces 10,000 pulses per revolution, then the rotational speed n will be:

$$n = 48,000/N \text{ (rpm)} \qquad (8)$$

In the previously proposed system, therefore, the rotational speed is detected using Eq. (7) or (8) upon finding the period T of the pulses $P_c$, namely the number N of clock pulses CP generated in one period of the pulses $P_c$, when the motor is rotating at low speed.

The proposed system is illustrated in the block diagram of FIG. 10. Here, numeral 301 denotes a pulse generator for producing a pair of pulse signals $P_c$, $P_c'$ displaced in phase from each other by $\pi/2$, the pulses in each signal being generated whenever a motor (not shown) rotates by a predetermined amount. A rotational direction discriminating circuit 302 produces a rotational direction signal SGN upon sensing which of the two pulse signals $P_c$, $P_c'$ leads in phase. A counter 303 has a clear terminal CLR, a count enable terminal EN, a clock terminal CLK, and a carry pulse generating terminal TC. The pulse signal $P_c$ is applied to the clear terminal CLR, and logical "1" is constantly applied to the count enable terminal EN. The counter 303 consequently is cleared of its data each time a pulse $P_c$ is generated, and thus counts up the clock pulses CP until the generation of the next pulse $P_c$. A flip-flop 304 is set each time the counter 303 generates a carry pulse OFP, and is reset each time a pulse $P_c$ is generated. Thus, the counter 303 and flip-flop 304 serve to count the clock pulses that are generated in one period of the pulses $P_c$. It should be noted, however, that the flip-flop 304 can be dispensed with if the counter 303 has a sufficiently large capacity. Numeral 305 denotes an AND gate, and 306 an n-bit register in which the value of the count in counter 303 is set whenever the output of AND gate 305 goes to logical "1", that is, whenever the pulse $P_c$ is generated. Numeral 307 denotes a two-bit register in which the set output of flip-flop 304 and the rotational direction signal SGN ('1" for forward rotation, "0" for reverse rotation) are set each time the output of AND gate 305 goes to logical "1". A divider 308 receives the data from registers 306, 307 to execute the arithmetic operation of Eq. (8), whereby the rotational speed n is computed. The divider 308 can be realized by relying upon the dividing function of a microcomputer for digitally executing speed control. The divider can be realized quite simply with modern microcomputers that permit 16-bit division in 10 $\mu$s or less.

In the operation of the apparatus shown in FIG. 10, counter 303 and flip-flop 304 are reset whenever the pulse generator 301 generates the pulse $P_c$. Once reset, the counter 303 and flip-flop 304 cooperate to count N-number of clock pulses CP until the arrival of the next pulse $P_c$, thereby measuring the period of the pulse $P_c$. When said next pulse $P_c$ is generated, the data stored in counter 303 and in flip-flop 304, as well as the rotational direction signal SGN, are set in registers 306, 307. At the same time, counter 303 and flip-flop 304 are reset again start counting the clock pulses CP. The number N of clock pulses CP stored in the registers 306, 307 is read by the divider 308 which then executes the dividing operation of Eq. (8) to find the rotation speed (rpm) n. Thus, in accordance with the method described in connection with FIG. 10, the detected value is not intermittent, even when the rotational speed or rpm n is very small, as shown in FIG. 11. This enables the speed to be detected much more accurately than in the prior art.

It will be noted from FIG. 11 that the detected speed has a step-like appearance in the previously proposed method. In other words, with the method just described, the actual speed is computed each time the pulse generator issues a pulse, the waveform of the detected speed rises so as to remain equivalent to the actual speed, and the detected value is maintained until the generation of the next pulse. In consequence, though no problem is encountered when the motor speed is constant or when the change in motor speed is gradual, the step width is too large in the case of a comparatively abrupt change in speed, so that an accurate indication of speed cannot be obtained between pulses. This implies the introduction of a delay factor into the speed detection system, meaning that quick-response control cannot be achieved when the gain of the speed control loop is raised.

The foregoing problem is encountered not only in speed control systems for synchronous motors but also in systems for controlling the speed of induction motors.

SUMMARY OF THE INVENTION

Accordingly, a first object of the present invention is to provide a novel speed detection apparatus which enables the actual speed of an AC motor to be detected with greater accuracy than that heretofore possible.

A second object of the present invention is to provide a novel speed detection apparatus which enables the actual speed of an AC synchronous motor to be detected with greater accuracy than that heretofore possible.

A third object of the present invention is to provide a novel speed detection apparatus which enables the actual speed of an AC induction motor to be detected with greater accuracy than that heretofore possible.

These and other objects and features of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram useful in describing a resolver employed in the arrangement of FIG. 4;

FIG. 6 is a waveform diagram showing the outputs of the resolver;

FIG. 7 is a circuit diagram of a two-phase to three-phase converter employed in the arrangement of FIG. 4;

DESCRIPTION OF THE PREFERRED EMBODIMENTS

Figure 10:
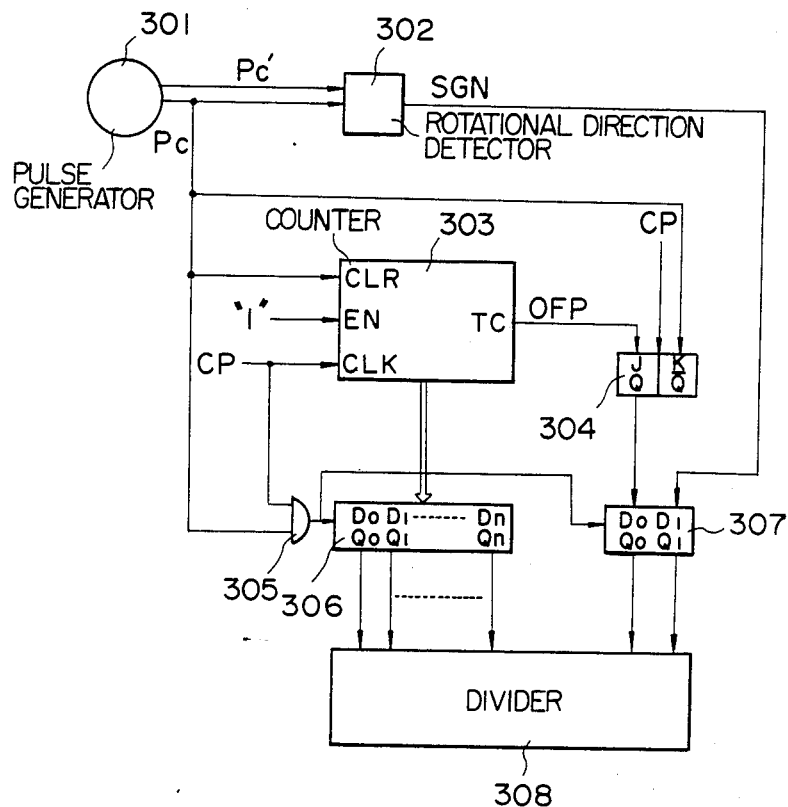
FIG. 10 is a block diagram and FIG. 11 a timing chart for describing a previously proposed speed detection method.
Figure 11:
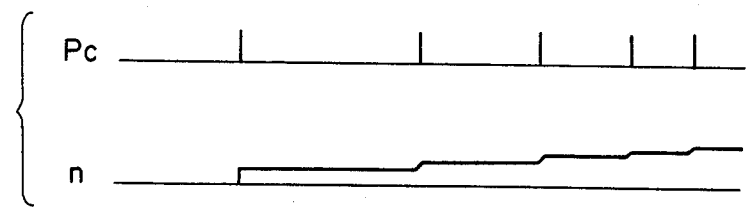

In accordance with the present invention, the speed of a synchronous motor is computed using the method described in connection with FIG. 10 at each instant that a pulse is generated by a pulse generator attached to the shaft of the motor. Then, each time an enable pulse of a fixed period is generated between pulses produced by the pulse generator, the present or actual speed of the motor is predicted in accordance with the characteristics of the motor, using a past armature voltage command, a past detected speed, a past detected armature current and a present detected armature current. The predicted speed is taken to be the detected speed.

The operations for predicting the speed of a synchronous motor are as follows. If the inertia of the synchronous motor is $J_M$(kg.cm.sec$^2$), the load inertia $J_L$(kg.cm.sec$^2$), the rotational speed v, the load torque $T_o$ (kg.cm), the torque constant $K_t$(kg.cm./A), the back electromotive force constant $K_e$(V.sec./rad.), the armature voltage u(V.), the armature current i(A), the armature resistance $R_a(\Omega)$, and the armature inductance $L_a$ (H), then the following will hold:

$$\begin{cases} \frac{d}{dt} v(t) = \frac{K_t}{J_M + J_L} i(t) - \frac{1}{J_M + J_L} T_o(t) & (9) \\ \frac{d}{dt} i(t) = -\frac{K_e}{L_a} v(t) - \frac{R_a}{L_a} i(t) + \frac{1}{L_a} u(t) & (10) \end{cases}$$

$$\frac{d}{dt}\begin{bmatrix} v \\ i \end{bmatrix} = \begin{bmatrix} 0 & \frac{K_t}{J_M + J_L} \\ -\frac{K_e}{L_a} & -\frac{R_a}{L_a} \end{bmatrix} \times \begin{bmatrix} v \\ i \end{bmatrix} + \quad (11)$$

$$\begin{bmatrix} 0 \\ \frac{1}{L_a} \end{bmatrix} u(t) + \begin{bmatrix} -\frac{1}{J_M + J_L} \\ 0 \end{bmatrix} T_o(t)$$

and $$\frac{d}{dt} X = A \times X + B \times u(t) + C \times T_o(t) \quad (12)$$

can be expressed as a matrix. Let T be the sampling period. When motor control is achieved through sampling, the foregoing continuous system may be converted into the following discrete value system:

$$X(k + 1) = \Phi \times X(k) + H \times u(k) + D \times T_o(t) \quad (13)$$

where:

$$\Phi = e^{AT}, H = \left[\int_0^T e^{At} dt\right] \times B, D = \left[\int_0^T e^{AT} dt\right] \times C.$$

Thus, the motor speed and armature current may be expressed in terms of the following difference equations:

$$v(k+1) = \phi_{11} v(k) + \phi_{12} i(k) + h_1 u(k) + d_1 T_o(k)$$

$$i(k+1) = \phi_{21} v(k) + \phi_{22} i(k) + h_2 u(k) + d_2 T_o(k) \quad (14)$$

Eliminating $T_o(k)$ from the above gives us:

$$v(k + 1) = \left(\phi_{11} - \phi_{21} \times \frac{d_1}{d_2}\right) v(k) + \quad (15)$$

$$\left(\phi_{12} - \Phi_{22} \times \frac{d_1}{d_2}\right) i(k) +$$

$$\left(h_1 - h_2 \times \frac{d_1}{d_2}\right) u(k) + \frac{d_1}{d_2} i(k + 1)$$

Transforming, we have:

$$v(k) = \alpha_1 v(k - 1) + \alpha_2 i(k - 1) + \alpha_3 u(k - 1) + \alpha_4 i(k) \quad (16)$$

where:

$$\alpha_1 = \phi_{11} - \phi_{21} \times \frac{d_1}{d_2}$$

$$\alpha_2 = \phi_{12} - \phi_{22} \times \frac{d_1}{d_2}$$

$$\alpha_3 = h_1 - h_2 \times \frac{d_1}{d_2}$$

$$\alpha_4 = \frac{d_1}{d_2}$$

According, if we know the detected speed v(k-1), the detected armature current magnitude i(k-1) and the armature voltage command magnitude u(k-1), which prevailed one sampling ago, as well as the armature current magnitude i(k) at the time of the present sampling, then the rotational speed of the motor at the time of the present sampling can be predicted from Eq. (16). In practice, the detected armature current magnitude i and the armature voltage command magnitude u are the detected magnitude I of the armature current amplitude and the magnitude U of the armature voltage amplitude command, respectively. Therefore, the following equation holds:

$$v(k) = a_1 v(k-1) + a_2 I_a(k-1) + a_3 U(k-1) + a_4 I_a(k) \quad (17)$$

and control of the synchronous motor is executed by a microcomputer on the basis of Eq. (17).

Figure 12:
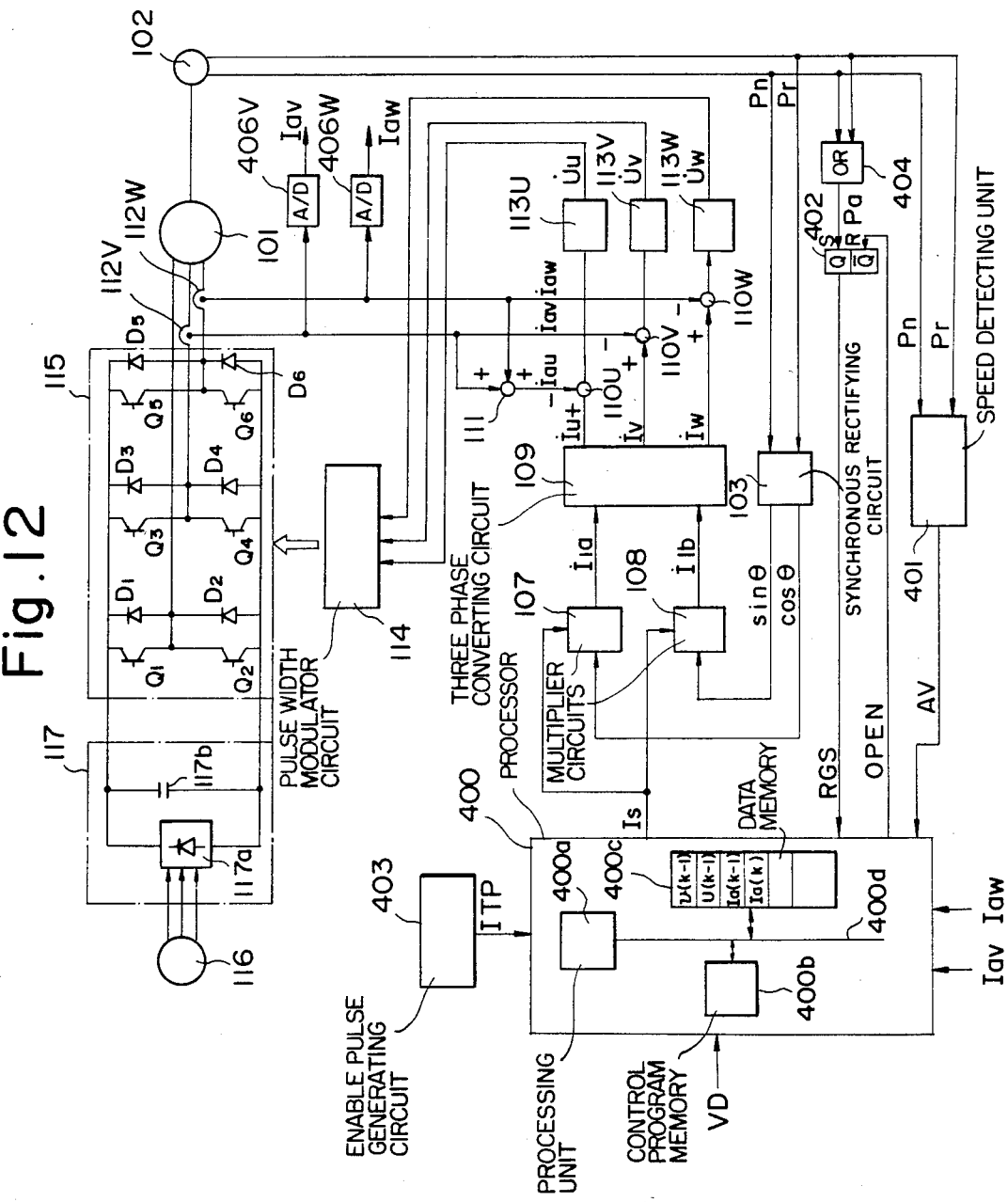
FIG. 12 is a block diagram illustrating a first embodiment of an AC motor speed detedtion apparatus according to the present invention.
Figure 13:
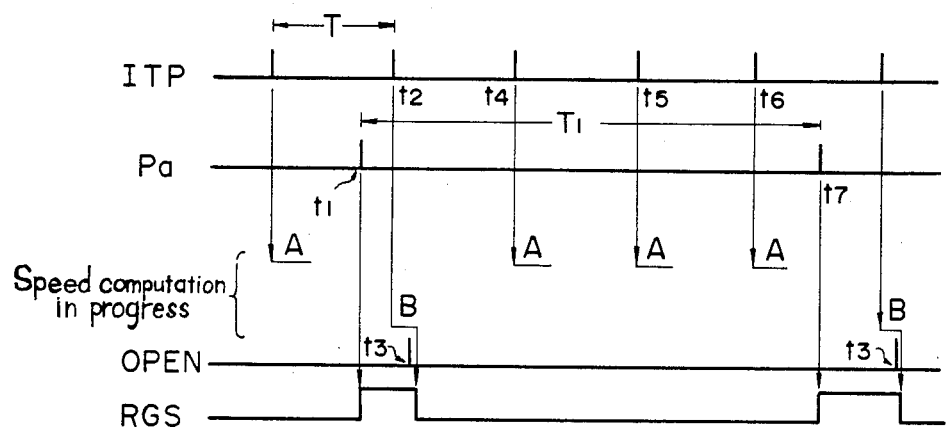
FIG. 13 is a timing chart associated with the operation of the apparatus shown in FIG. 12.
Figure 14:
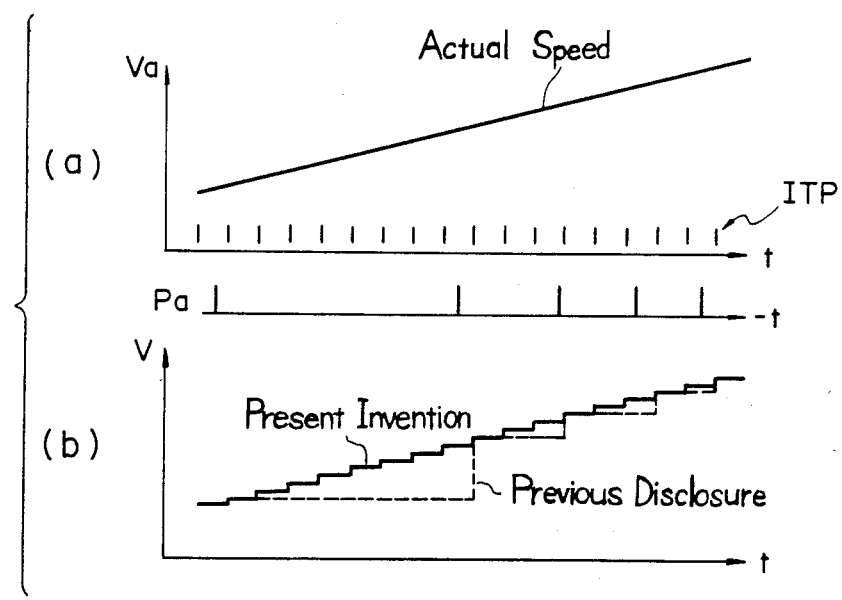
FIG. 14 is a view useful in describing the operation of the speed detection apparatus of FIG. 12.

Reference will now be had to FIGS. 12 through 14 to describe a first embodiment of an apparatus for detecting the speed of a synchronous motor according to the present invention.

In FIG. 12, numeral 400 denotes a processor constructed as a microprocessor, including a processing unit 400a, a control program memory 400b, and a data memory 400c, which are interconnected by means of a data bus 400d. Numeral 401 denotes a speed detecting unit having the construction shown in FIG. 10, minus the pulse generator 301 and divider 308. Provided is a flip-flop 402 set by the output pulse Pa from a OR-circuit 404 which performs logical OR operation of pulse Pn and Pr pulse and reset by a speed computation end signal OPEN generated by a processor 113. An enable pulse generating circuit 403 generates a speed computation enable pulse ITP (namely an interrupt signal of a fixed period, the signal entering the processor 400. The processor 400 receives also a digital command speed VD, as well as the digital value denoted AV, which is indicative of the period from the registers 306, 307 in the arrangement of FIG. 10.

Figure 1:
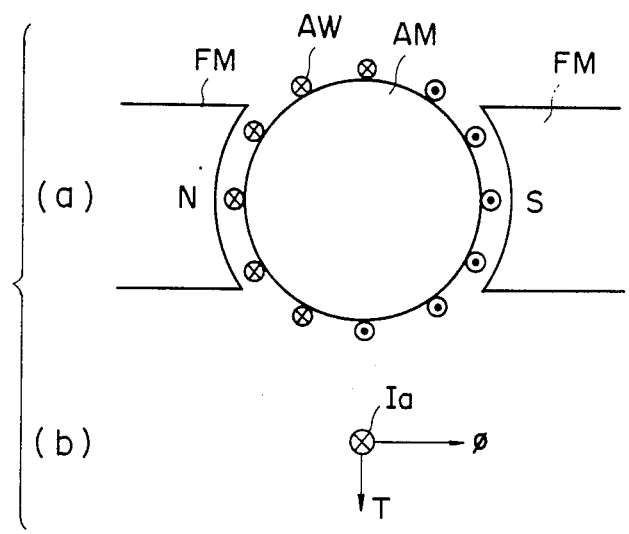
FIGS. 1 through 3 are views useful in describing the principles of a system for controlling a synchronous motor.
Figure 2:
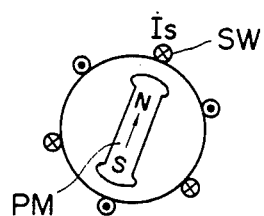
Figure 3:
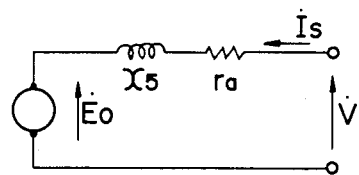
Figure 4:
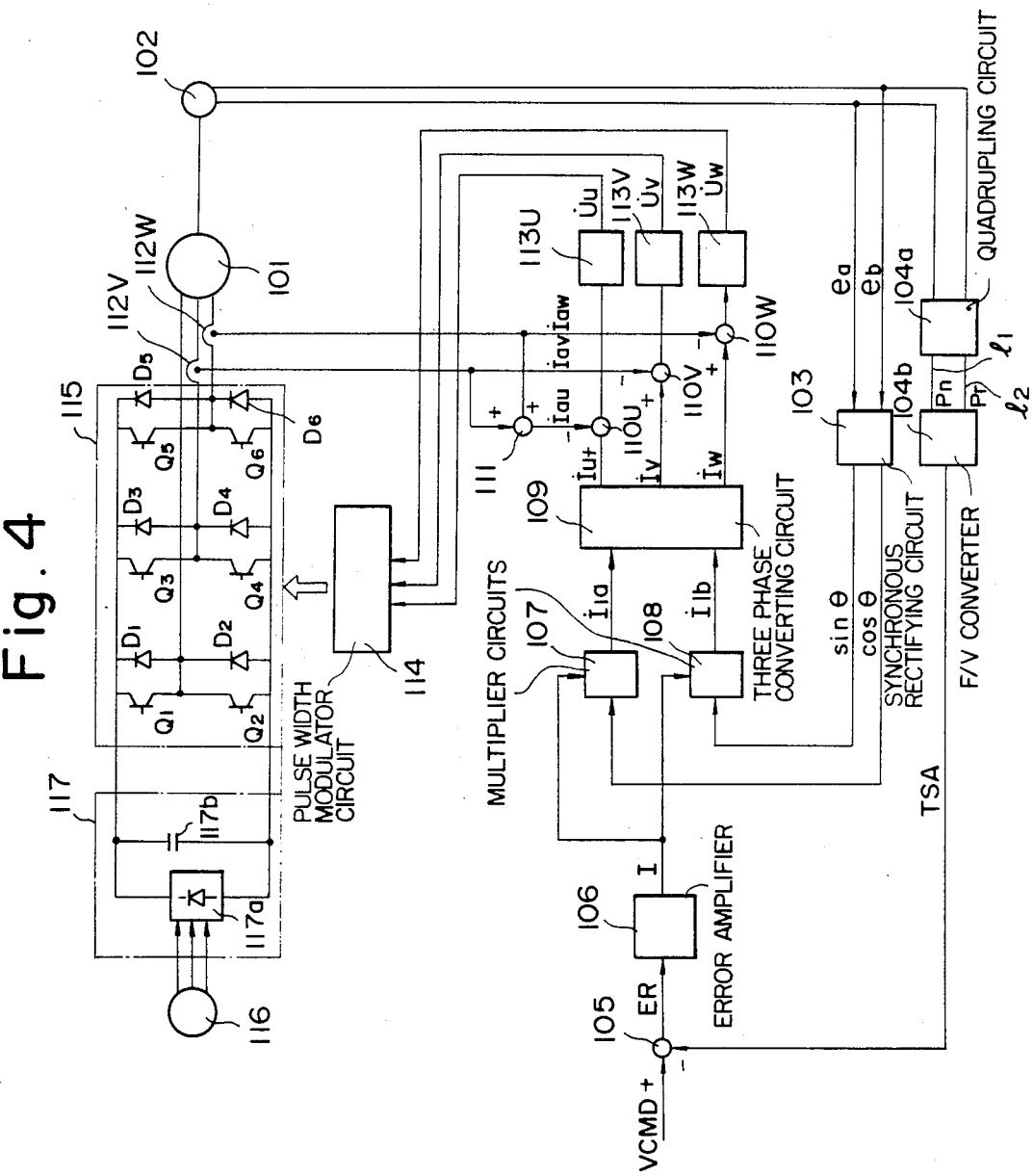
FIG. 4 is a block diagram of a conventional circuit for driving a synchronous motor.
Figure 8:
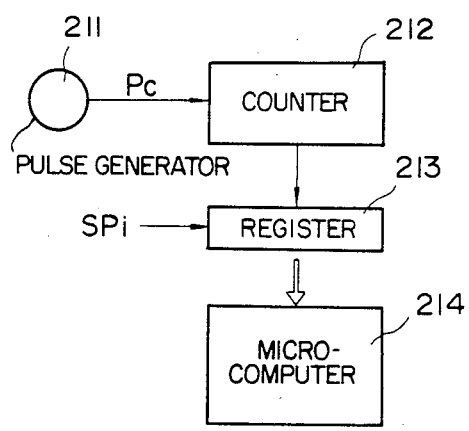
FIGS. 8 and 9 are views useful in describing a prior-art speed control system.
Figure 9:
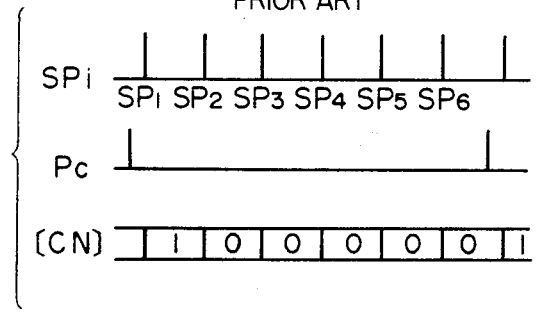

Regarding the speed detection operation, flip-flop 402 is set RGS goes to logical "1" at the instant (time t₁ in FIG. 13) pulse $P_a$ is generated by the pulse generator 102. When the interrupt pulse IPT of a fixed period is generated by the generating circuit 403 at time t₂, the processor 400 first senses whether flip-flop 402 is in the set state. Since such will be the case at this time, the processor 400 uses the period AV of the pulses $P_n$ s(AV being obtained from the speed detecting unit 401) to perform the division of Eq. (8) in order to find the rotational speed. At the end of the computation (time t₃), the processor 400 produces the speed computation end pulse OPEN, thereby resetting flip-flop 402 to restore the initial conditions. Thenceforth the processor computes the speed error i.e., ER is FIG. 4) and produces the armature or primary current amplitude signal I_s on the basis of the speed error. The remaining circuitry, whose function has already been described in conjunction with FIG. 4, controls the synchronous motor 101 on the basis of the armature (primary) current.

In the foregoing, the flip-flop 402 was in the set state when the interrupt pulse ITP was produced. When the flip-flop is in the reset state at the time that in interrupt pulse ITP is generated, however, the arrangement is such that the rotational speed is estimated in a manner which will now be described.

When the periodic interrupt pulse ITP appears at time t₄, processor 400 senses the state of flip-flop 402 which, according to FIG. 13, is logical "0", indicating that the flip-flop has been reset. The processor 400 therefore performs the operation of Eq. (17), to estimate the rotational speed v(k), using the past detected speed v(k-1), the past detected magnitude I_a(k-1) of the armature current amplitude, the past magnitude U(k-1) of the armature voltage amplitude command, and the present detected magnitude I_a of the armature current, all of which have been stored in the data memory 400c. The processor then computes the difference between the commanded speed VD and the estimated rotational speed v(k), which is taken as the actual speed, and performs the same operations as described above, whereby the three-phase armature voltage commands $U_u$, $U_v$, $U_w$ are produced.

It should be noted that the detected amplitude I_a of the armature current amplitude may be expressed by the following in terms of the V- and W-phase currents $I_{av}$, $I_{aw}$:

$$i_{au}^2 + i_{av}^2 + i_{aw}^2 = \frac{3}{2} I_a^2 \quad (18)$$

$$I_a = \sqrt{\frac{2}{3}(i_{au}^2 + i_{av}^2 + i_{aw}^2)}$$

$$= \sqrt{\frac{3}{2}\{I_{av}^2 + I_{aw}^2 + (I_{av} + I_{aw})^2\}}$$

$$= \frac{2}{\sqrt{3}} \sqrt{I_{av}^2 + I_{aw}^2 + I_{av} I_{aw}}$$

Thus, when $I_{av}$, $I_{aw}$ are read through the A/D converters 406u, 406w, it is possible for the processor 400 to find the magnitude Ia of the armature current amplitude command through arithmetic operations. The magnitude U of the armature voltage amplitude command can, by way of example, be found from the following equation on the basis of the speed difference e and the detected magnitude Ia of the armature current amplitude:

$$U(k) = -g_1 \cdot e(k) - g_2 \cdot I_a(k) \quad (19)$$

where g₁, g₂ represent feedback gain. The processor 400 then proceeds to perform the operation of Eq. (16) in order to estimate the actual motor speed even at times t₅, t₆, since the flip-flop FF402 will not be in the set state. When the pulse $P_a$ appears at time t₇, flip-flop 402 is set by the pulse, at which time the processor 400 finds the rotational speed using the pulse period AV, as mentioned above.

If we assume that the actual speed $V_a$ of the synchronous motor varies as shown in (a) of FIG. 14, then, in accordance with the present invention, the detected speed will vary as shown by the solid line in (b) of Fig. 14. It will be appreciated that the step width is much smaller in comparison with the previously disclosed method, indicated by the dashed line. Speed thus is detected with great accuracy.

The present invention is applicable also to an induction motor. For driving an induction motor a vector control method is known which has a torque generating mechanism equivalent to that of a DC motor.

Figure 15:
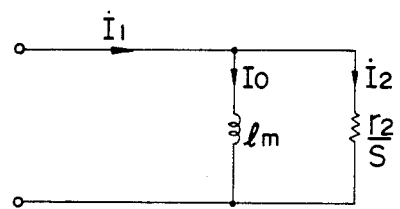
FIGS. 15 and 16 are illustrative views for describing vector control.
Figure 16:
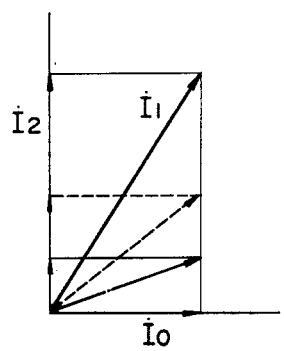

FIGS. 15 and 16 are useful in describing the above-mentioned torque control method. FIG. 15 illustrates a circuit equivalent to an induction motor under vector control, and FIG. 16 shows the relationship between excitation current I_o and second current I₂ under vector control. In FIG. 15, l_m denotes the excitation reactance, r₂ the equivalent resistance, and S the slip. In view of this equivalent circuit of the induction motor, the generated torque T may be expressed:

$$T = \frac{3 r_2 l_2}{S \cdot w_s} \cdot I_2 \qquad (19')$$

(where $w_s$ is the slip angular frequency). If we assume that $I_2$ and $S.w_s$ are proportional, then the torque T will be proportional to the secondary current, and the torque generating mechanism will be the same as that of a DC motor. It should be noted that the following will hold from FIG. 15:

$$w_s \cdot l_m \cdot I_o = \frac{r_2}{S} I_2 \qquad (20)$$

$$\therefore S \cdot w_s = \frac{r_2 I_2}{l_m I_o}$$

so on current $I_o$ must be held constant in order to establish the proportional relationship between $I_2$ and $S.w_s$.

The foregoing vector control method holds the excitation current $I_o$ constant and varies only the secondary current $I_2$ proportionally with respect to load torque, while assuring that the perpendicularity between the excitation current $I_o$ and the secondary current $I_2$ is maintained. When vector control is actually carried out, the error (speed error) ER between the commanded speed and the actual speed is taken as a torque command, and the primary current $I_1$ is so set as to satisfy the following relation in accordance with teh speed error ER:

$$\begin{aligned} I_1 &= I_o + jI_2 \\ &= I_o + jK \cdot ER \end{aligned} \qquad (21)$$

(where k is a constant).

Figure 17:
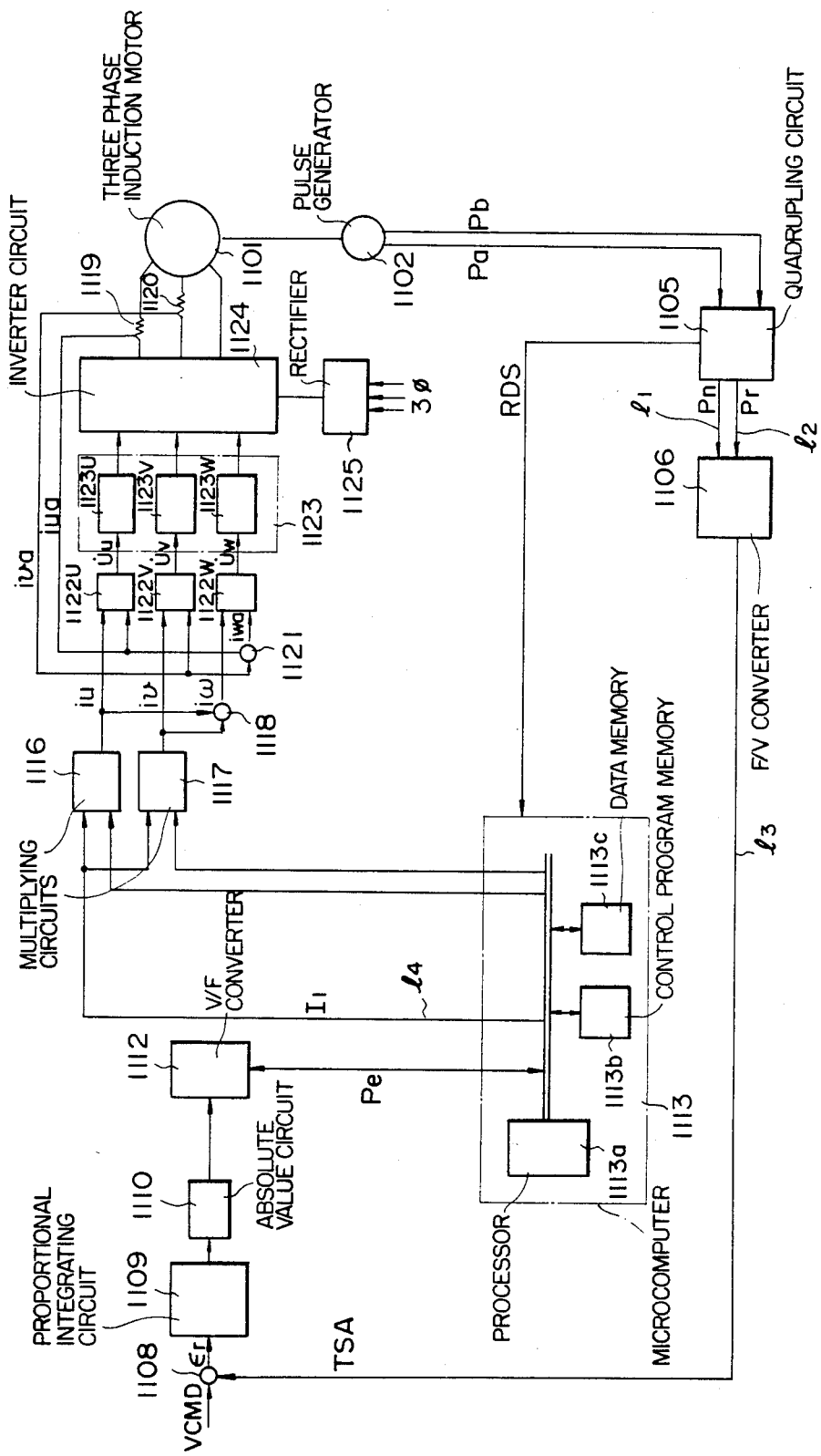
FIG. 17 is a block diagram of an arrangement for achieving vector control.

The foregoing vector control is achieved by means of the arrangement shown in FIG. 17. Numeral 1101 denotes a three-phase induction motor, and 1102 a pulse generator, such as a resolver, for generating two sinusoidal signals $P_a$, $P_b$ which are displaced in phase from each other 90° and proportional to the rotational speed of the motor. A quadrupling circuit 1105 receives the two-phase sinusoidal signals $P_a$, $P_b$ and is adapted to convert them into pulse trains having four times the frequency of the input sinusoidal signals. The quadrupling circuit 1105 monitors the sinusoidal signals $P_a$, $P_b$, produces a rotational direction signal RDS, and delivers a forward pulse train $P_n$ of the quadrupled frequency on line l$_1$ when the motor is rotating in the forward direction, and a reverse pulse train $P_r$ on line l$_2$ when the motor is rotating in the reverse direction. The forward and reverse pulse trains $P_n$, $P_r$ are applied to a frequency-voltage converter (referred to hereinafter as an F/V converter) 1106 adapted to convert the pulse frequency into a voltage signal TSA indicative of the actual speed of the induction motor. An arithmetic circuit 1108 receives the actual speed voltage signal TSA as well as a speed command voltage VCMD from a speed command circuit, not shown, and is adapted to generate the difference (known as the speed error) ER betwen TSA and VCMD. A proportional integrating circuit 1109 proportionally integrates the error signal ER from the arithmetic circuit 1108. An absolute value circuit 1110 takes the absolute value of the speed error ER and applies it to a voltage-frequency (V/F) converter 1112 which responds by producing a pulse train $P_e$ whose frequency is proportional to the magnitude of ER. The pulse train $P_e$ enters a microcomputer 1113 having a processor 113a, a control program memory 1113b and a data memory 1113c. The data memory 1113 stores such digital data as the torque vs. amplitude characteristic (T-I$_1$ characteristic) and the rotation angle vs. sine value characteristics (sine pattern), in the form of a function table. The processor 1113a counts the pulses $P_e$ from the V/F converter 1112 for a predetermined period of time under the direction of the control program and utilizes the counted value N as well as the T-I$_1$ characteristic to produce a digital signal indicative of the current amplitude I$_1$. In other words, the processor takes the counted value N as the torque command and finds I$_1$ from the T-I$_1$ characteristic, with I$_1$ being delivered as the current command. It should be noted that this current command is the amplitude of the primary current I$_1$ in Eq. (21). The processor 1113a produces the following outputs in the form of digital signals:

$$\sin(w_n t + w_s t + \psi) \qquad (22)$$

$$\sin(w_n t + w_s t + \psi + 2\pi/3) \qquad (23)$$

using pulse train $P_n$ or $P_r$ which has an angular frequency $w_n$ proportional to the rotation speed of the induction motor 1101, as well as a constant phase difference $\psi$, etc. Note that $w_s$ represents the slip angular frequency, and $\psi$ the phase difference.

Numerals 1116, 1117 are multiplying circuits for performing the operations:

$$I_1 \cdot \sin(w_n t + w_s t + \psi) \qquad (24)$$

$$I_1 \cdot \sin(w_n t + w_s t + \psi + 2\pi/3) \qquad (25)$$

for converting these values into analog quantities, and for delivering the corresponding analog current commands $i_u$, $i_v$ for the U- and V-phases. The commands $i_u$, $i_v$ are applied to a phase converter 1118 which performs the addition:

$$i_u + i_v \rightarrow i_w \qquad (26)$$

to produce the current command $i_w$ of the W-phase. Current transformers 1119, 1120 are provided for sensing the phase currents $i_{au}$, $i_{va}$ flowing in the U- and V-phases of the induction motor. An arithmetic circuit 1121 receives the phase currents $i_{ua}$, $i_{va}$ and performs the addition:

$$i_{ua} + i_{va} \rightarrow i_{wa} \qquad (27)$$

thereby delivering the phase current $i_{wa}$ which flows in the W-phase. Current control circuits 1122U, 1122V, 1122W, provided for the resepctive phases U, V, W, compute and then amplify the current differences ($i_u$-$i_{ua}$), ($i_v$-$i_{va}$), ($i_w$-$i_{wa}$). A pulse width modulator 1123 has three pulse width modulating circuits 1123U, 1123V, 1123W for the respective phases U, V, W for pulse-width modulating the three computed current differences. The outputs of the pulse width modulating circuits are applied to an inverter circuit 1124 comprising a number of tansistors. A rectifier 1125 converts three-phase alternating current into direct current.

In the proposed system, as described above in the "Background of the Invention", the period T of pulses $P_c$ generated by the pulse generator when the motor is rotating at low speed is found by counting the pulses, and the motor speed is sensed on the basis of the period T. This will be described once again. If we assume that N-number of clock pulses CP are generated in one period of the pulses $P_c$ and that the period of the clock pulses is T(=0.125 μs), then the frequency f of the pulses $P_c$ from the pulse generator may be expressed:

$$\begin{aligned} f &= 1/T \\ &= 1/N \cdot \Delta T \text{ (Hz/}\mu\text{sec)} \\ &= 10^6/N \cdot \Delta T \text{ (Hz/sec)} \\ &= 60 \times 10^6 N \cdot \Delta T \text{ (Hz/min)} \end{aligned}$$

Substituting for ΔT we have:

$$f = 480 \times 10^6 N \text{ (Hz/min)} \qquad (28)$$

If the pulse generator produces 10,000 pulses per revolution, then the rotational speed n will be:

$$n = 48,000/N \text{ (rpm)} \qquad (29)$$

In the previously proposed system, therefore, the rotational speed is detected using Eq. (28) or (29) upon finding the period T of the pulses $P_c$, namely the number N of clock pulses CP generated in one period of the pulses $P_c$, when the motor is rotating at low speed.

Figure 18:
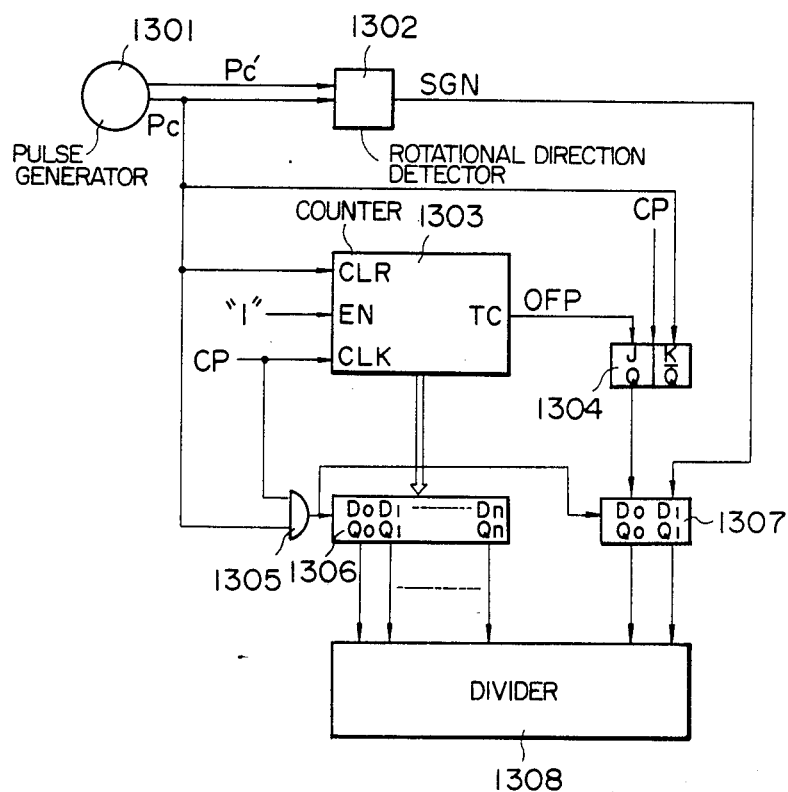
FIG. 18 is a block diagram and FIG. 19 a timing chart for describing a previously proposed speed detection method.

The proposed system is illustrated in the block diagram of FIG. 18. Here, numeral 1301 denotes a pulse generator for producing a pair of pulse signals $P_c$, $P_c'$ displaced in phase from each other by $\pi/2$, the pulses in each signal being generated whenever a motor (not shown) rotates by a predetermined amount. A rotational direction discriminating circuit 1302 produces a rotational direction signal SGN upon sensing which of the two pulse signals $P_c$, $P_c'$ leads in phase. A counter 1303 has a clear terminal CLR, a count enable terminal EN, a clock terminal CLK, and a carry pulse generating terminal TC. The pulse signal $P_c$ is applied to the clear terminal CLR, and logical "1" is constantly applied to the count enable terminal EN. The counter 1303 consequently is cleared of its data each time a pulse $P_c$ is generated, and thus counts up the clock pulses CP until the generation of the next pulse $P_c$. A flip-flop 1304 is set each time the counter 1303 generates a carry pulse OFP, and is reset each time a pulse $P_c$ is generated. Thus, the counter 1303 and flip-flop 1304 serve to count the clock pulses that are generated in one period of the pulses $P_c$. It should be noted, however, that the flip-flop 1304 can be dispensed with if the counter 1304 has a sufficiently large capacity. Numeral 1305 denotes an AND gate, and 1306 an n-bit register in which the value of the count in counter 1303 is set whenever the output of AND gate 1305 goes to logical "1", that is, whenever the pulse $P_c$ is generated. Numeral 1307 denotes a two-bit register in which the set output of flip-flop 1304 and the rotational direction signal SGN ("1" for forward rotation, "0" for reverse rotation) are set each time the output of AND gate 1305 goes to logical "1". A divider 1308 receives the data from registers 1306, 1307 to execute the arithmetic operation of Eq. (29), whereby the rotational speed n is computed. The divider 1308 can be realized by relying upon the dividing function of a microcomputer for digitally executing speed control. The divider can be realized quite simply with modern microcomputers that permit 16-bit division in 10 μs or less.

Figure 19:
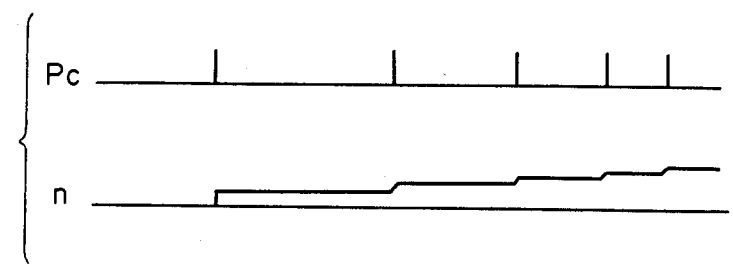

In the operation of the apparatus shown in FIG. 18, counter 1303 and flip-flop 1304 are reset whenever the pulse generator 1301 generates the pulse $P_c$. Once reset, the counter 1303 and flip-flop 1304 cooperate to count N-number of clock pulses CP until the arrival of the next pulse $P_c$, thereby measuring the period of the pulses $P_c$. When the next pulse $P_c$ is generated, the data stored in counter 1303 and in flip-flop 1304, as well as the rotational direction signal SGN, are set in registers 1306, 1307. At the same time, counter 1303 and flip-flop 1304 are reset again and start counting the clock pulses CP. The number N of clock pulses CP stored in the registers 1306, 1307 is read by the divider 1308 which then executes the dividing operation of Eq. (29) to find the rotational speed (rpm) n. Thus, in accordance with the method described in connection with FIG. 18, the detected value is not intermittent even when the rotational speed or rpm n is very small, as shown in FIG. 19. This enables the speed to be detected much more accurately than in the prior art method of counting pulses from a pulse generator connected to the shaft of an induction motor.

A further improvement in speed detection accuracy can be achieved in accordance with the second embodiment of the present invention which will be described hereinbelow.

In accordance with the present invention, the speed of an induction motor is computed using the method described in connection with FIG. 18 at each instant that a pulse is generated by a pulse generator attached to the shaft of the motor. Then, each time an enable pulse of a fixed period is generated between pulses produced by the pulse generator, the present or actual speed of the induction motor is predicted in accordance with the characteristics of the motor, using a past magnitude of the current command as well as past detected speed. The predicted speed is taken to be the detected speed.

The operations for predicting the actual speed of the induction motor will now be described. If the inertial of the induction motor is $J_M$(kg.cm.sec²), the load inertia JL(kg.cm.sec²), the rotational speed v, the load torque $T_o$ (kg.cm), the torque constant $K_t$(kg.cm./A), the back electromotive force constant $K_e$(V.sec./rad.), the armature voltage u(V.), the armature current i(A), the armature resistance $R_a(\Omega)$, and the armatuure inductance $L_a$(H), then Eq (9) and (17) will hold, as in the case of the synchronous motor, and the detected speed v(k) at the present time will be found from Eq. (17) using the speed v(k-1) detected one sampling ago, the magnitudes $I_a$(k-1), I (k) of the armature current amplitude, which prevailed one sampling ago and which presently prevail, and the magnitude V(k-1) of the armature voltage amplitude command detected one sampling ago.

Figure 20:
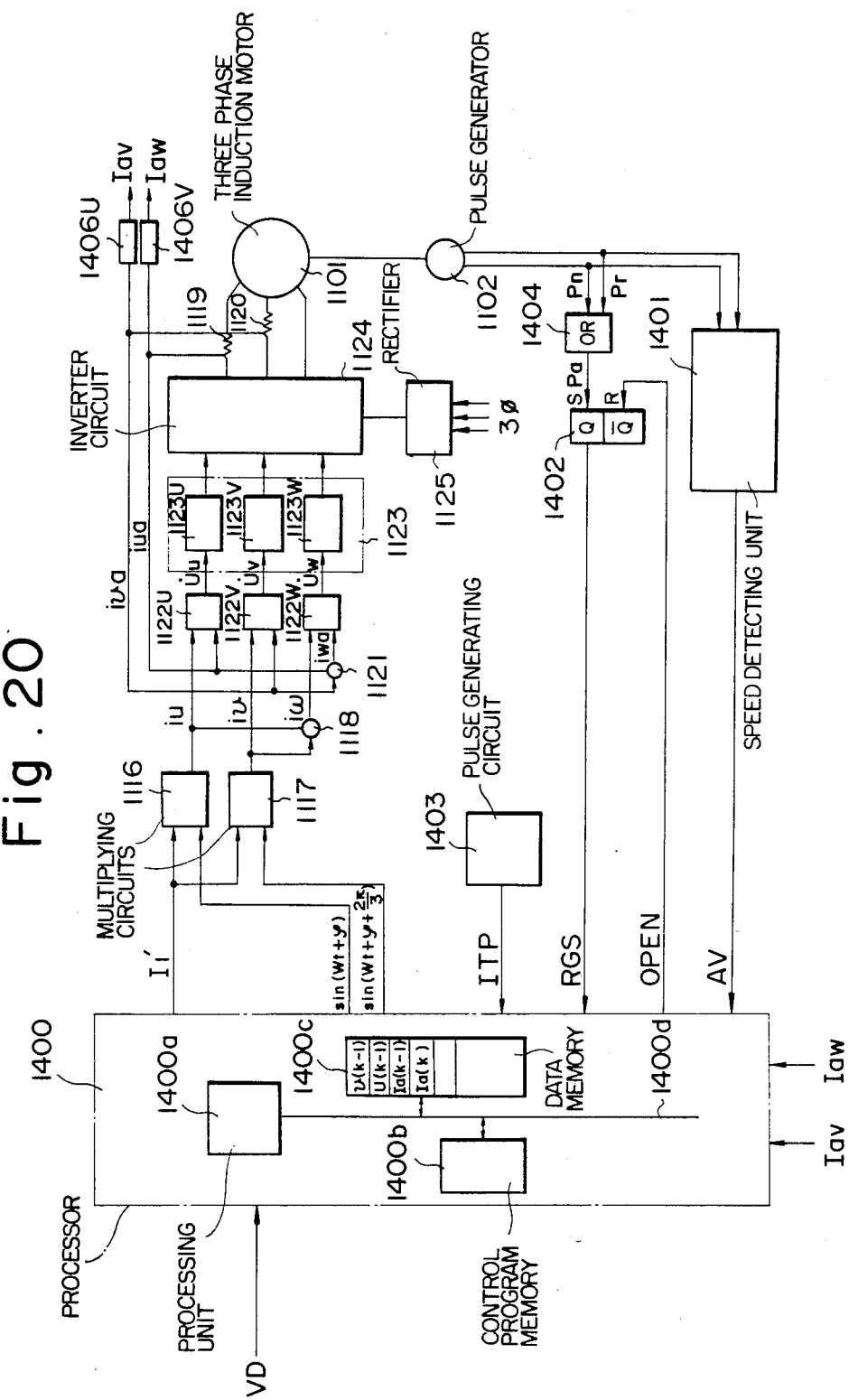
FIG. 20 is a block diagram illustrating a second embodiment of an AC motor speed detection apparatus according to the present invention.
Figure 21:
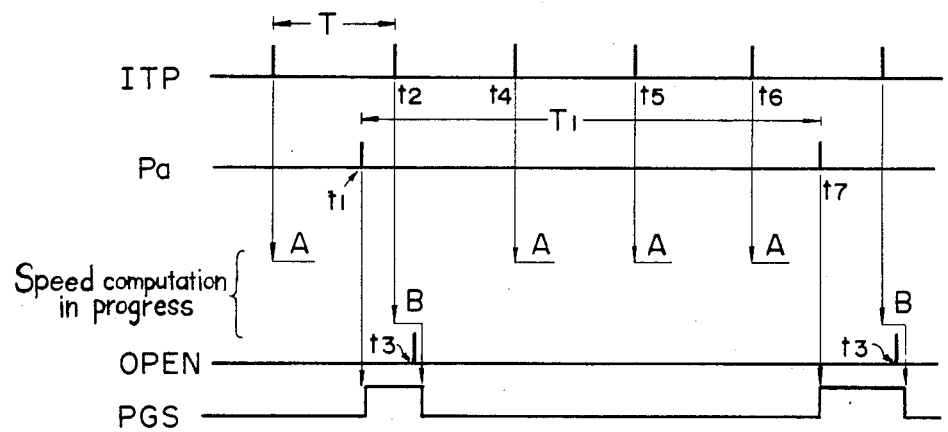
FIG. 21 is a timing chart associated with the operation of the speed detection apparatus of FIG. 20.
Figure 22:
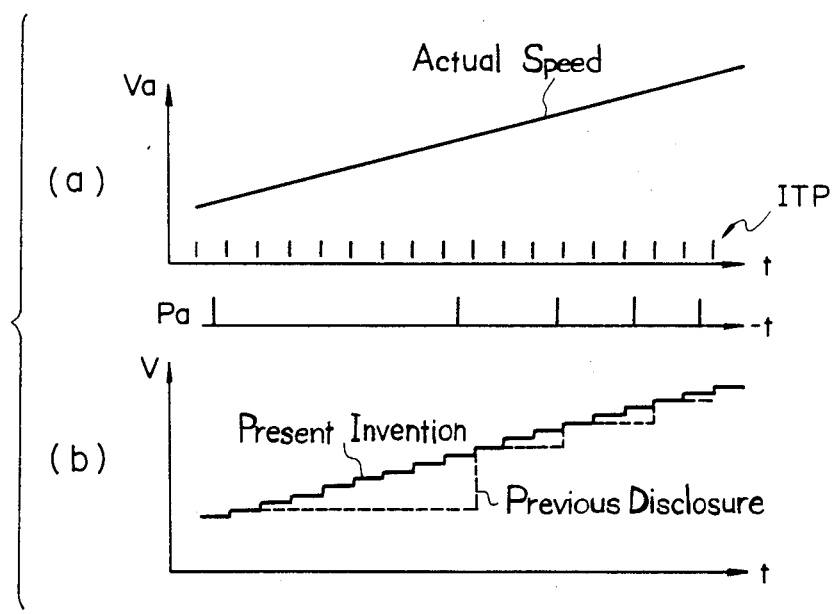
FIG. 22 is a view useful in describing the operation of the speed detection apparatus of FIG. 20.

Reference will now be had to FIGS. 20 through 22 to describe a second embodiment of an apparatus for detecting the speed of an induction motor according to the present invention.

In FIG. 20, numeral 1400 denotes a processor constructed as a microprocessor, including a processing unit 1400a, a control program memory 1400b, and a data memory 1400c, which are inter-connected by means of a data bus 1400c. Numeral 1401 denotes a speed detecting unit having the construction shown in FIG. 18, minus the pulse generator 1301 and divider 1308. Provided is a flip-flop 1402 set by the pulse output pulse $P_a$ from a OR-circuit 1404 which performs logical OR operation of pulse $P_n$ and $P_r$, and reset by a speed computation end signal OPEN generated by a processor 1400. An enable pulse generating circuit 1403 generates a speed computation enable pulse ITP (namely an interrupt signal of a fixed period, the signal entering the processor 1400. The processor 1400 receives also a digital command speed VD, as well as the digital value, denoted AV, from the registers 1306, 1307 in the arrangement of FIG. 18.

Regarding the speed detection operation, flip-flop 402 is set (RGS goes to logical "1") at the instant (time $t_1$ in FIG. 21) pulse $P_a$ is generated by the pulse generator 1102. When the interrupt pulse IPT of a fixed period is generated by the generating circuit 1403 at time $t_2$, the processor 1400 first senses whether flip-flop 1402 is in the set state. Since such will be the case at this time, the processor 1400 uses the period AV of the pulses $P_a$ (AV being obtained from the speed detecting unit 1401) to perform the division of Eq. (29) in order to find the rotational speed. At the end of the computation (time $t_3$), the processor 1400 produces the speed computation end pulse OPEN, thereby resetting flip-flop 1402 to restore the initial conditions. Thenceforth the processor computes the speed error (i.e., ER is FIG. 4) and produces the armature or primary current amplitude signal $I_1$ as well as the phase signals having the phases given by Eqs. (24), (25) respectively, on the basis of the speed error. The remaining circuitry, whose function has already been described, controls the induction motor on the basis of the armature (primary) current.

In the foregoing, the flip-flop 1402 was in the set state when the interrupt pulse ITP was produced. When the flip-flop is in the reset state at the time that an interrupt pulse ITP is generated, however, the arrangement is such that the rotational speed is estimated in a manner which will now be described.

When the periodic interrupt pulse ITP appears at time $t_4$, processor 1400 senses the state of flip-flop 1402 which, according to FIG. 21, is logical "0", indicating that the flip-flop has been reset. The processor 1400 therefore performs the operation of Eq. (17), to estimate the rotational speed v(k), using the past detected speed v(k-1), the past detected magnitude $I_a$ (k-1) of the armature current amplitude, the past magnitude U(k-1) of the armature voltage amplitude command, and the present detected magnitude $I_a$ of the armature current, all of which have been stored in the data memory 1400c. The processor then computes the difference between the commanded speed VD and the estimated rotational speed v(k), which is taken as the actual speed, and performs the same operations as described above, whereby the three-phase armature voltage commands $U_u$, $U_v$, $U_w$ are produced. The processor 1400 proceeds to perform the operation of Eq. (17) in order to estimate the motor speed whenever the pulse ITP is produced with the flip-flop 1402 in the reset state, as at times $t_5$ and $t_6$. When the pulse $P_a$ appears at time $t_7$, flip-flop 1402 is set by the pulse, at which time the processor 1113 finds the rotational speed using the pulse period AV, as mentioned above.

If we assume that the actual speed $v_a$ of the induction motor varies as shown in (a) of FIG. 22 then, in accordance with the present invention, the detected speed will vary as shown by the solid line in (b) of FIG. 22. It will be appreciated that the step width is much smaller in comparison with the previously disclosed method, indicated by the dashed line. Speed is thus detected with great accuracy.

It should be noted that while the present invention has been described and illustrated for a case in which it is applied to the speed detection of AC motors regulated by a vector control method, the invention is applicable also in cases where AC motors are driven by other control methods. In performing the operation given by Eq. (17), moreover, use was made of the past current command magnitude. Rather than using the current command, however, it is permissible to employ the past magnitude of the actually measured current.

According to the present invention, motor speed can be detected with a high degree of accuracy. This makes it possible to drive an induction motor at a high gain and with a quick response.

As many apparently widely different embodiments of this invention may be made without departing from the spirit and scope thereof, it is to be understood that the invention is not limited to the specific embodiments thereof except as defined in the appended claims.

What we claim is:

1. An apparatus for detecting the speed of an AC motor driven by a current command, produced at regular intervals, based on a speed error between a commanded speed and the actual motor speed, which apparatus comprises:

means for generating a number of first pulses the number being proportional to the amount of AC motor rotation;

means for timing the period of said first pulses;

means for generating enable pulses at regular intervals;

means for receiving a sequence of commanded armature voltage values;

means for detecting armature current of said AC motor; and means for computing a present actual speed of the AC motor in synchronism with said enable pulses, on the basis of said period of said first pulses, at a time when a first pulse is generated by said pulse generating means, and for predicting a present actual speed, in synchronism with said enable pulses, on the basis of the magnitude of a commanded armature voltage, magnitude of a previously detected armature current, the magnitude of a present detected armature current and a previously computed actual speed, when enable pulses are generated in the absence of said first pulses from said pulse generating means.

2. The apparatus according to claim 1, in which the AC motor is in induction motor.

3. The apparatus according to claim 1, in which the AC motor is a synchronous motor.

* * * * *

UNITED STATES PATENT AND TRADEMARK OFFICE
CERTIFICATE OF CORRECTION

PATENT NO. : 4,575,667

DATED : March 11, 1986

INVENTOR(S) : Mitsuo Kurakake

It is certified that error appears in the above-identified patent and that said Letters Patent is hereby corrected as shown below:

Front Page, after "[22]" insert the following:

--[30] Foreign Application Priority Data
June 9, 1981 [JP] Japan . . . . 56-88521
June 9, 1981 [JP] Japan . . . . 56-88522--.

Column 1, line 60, "$T = K' \phi_s I_s$" should be --$T = k' \phi_s I_s = K_T I_s$--.

Column 2, line 43, "$l_1$" should be --$\ell_1$--;

line 45, "$l_2$" should be --$\ell_1$--.

Column 9, line 9, after the equation, insert --(17)--;
line 42, "$P_{ns}$ (A" should be $P_n$ (A--.

Column 10, line 67, "$l_m$" should be --$\ell_m$--.

Column 11, line 51, "$l_1$" should be --$\ell_1$--, line 52, "$l_2$" should be --$\ell_2$--.

Column 13, line 15, equation (28), "$f$" should be --$f$--.

Signed and Sealed this

Second Day of January, 1990

*Attest:*

JEFFREY M. SAMUELS

*Attesting Officer*  *Acting Commissioner of Patents and Trademarks*